United States Patent
Elsässer et al.

(10) Patent No.: US 8,746,216 B2
(45) Date of Patent: Jun. 10, 2014

(54) INTERNAL COMBUSTION ENGINE AND FRESH AIR SYSTEM

(75) Inventors: Alfred Elsässer, Keltern (DE); Bernhardt Lüddecke, Großniedesheim (DE)

(73) Assignee: Mahle International GmbH (DE)

( * ) Notice: Subject to any disclaimer, the term of this patent is extended or adjusted under 35 U.S.C. 154(b) by 106 days.

(21) Appl. No.: 13/386,761

(22) PCT Filed: Jul. 19, 2010

(86) PCT No.: PCT/EP2010/060419
§ 371 (c)(1),
(2), (4) Date: May 21, 2012

(87) PCT Pub. No.: WO2011/009835
PCT Pub. Date: Jan. 27, 2011

(65) Prior Publication Data
US 2012/0222642 A1     Sep. 6, 2012

(30) Foreign Application Priority Data
Jul. 24, 2009   (DE) .......................... 10 2009 034 653

(51) Int. Cl.
*F02B 47/08* (2006.01)
(52) U.S. Cl.
USPC ..................................... 123/568.11; 123/698
(58) Field of Classification Search
CPC ........................................................ B01F 5/06
USPC ....... 123/568.11, 568.21, 184.53, 198 E, 698, 123/568.17–568.19; 60/605.2, 272, 278
See application file for complete search history.

(56) References Cited

U.S. PATENT DOCUMENTS

| 4,498,786 | A | 2/1985 | Ruscheweyh |
| 6,425,382 | B1 * | 7/2002 | Marthaler et al. ........ 123/568.17 |
| 6,609,374 | B2 * | 8/2003 | Feucht et al. .................... 60/602 |
| 7,028,680 | B2 * | 4/2006 | Liu et al. ................... 123/568.17 |
| 7,032,578 | B2 * | 4/2006 | Liu et al. ................... 123/568.15 |
| 7,140,357 | B2 * | 11/2006 | Wei et al. .................. 123/568.17 |
| 7,389,770 | B2 * | 6/2008 | Bertilsson et al. ........ 123/568.17 |
| 7,552,722 | B1 * | 6/2009 | Shieh et al. ............... 123/568.17 |

(Continued)

FOREIGN PATENT DOCUMENTS

| DE | 3440328 A1 | 8/1986 |
| DE | 102004025254 A1 | 12/2005 |

(Continued)

OTHER PUBLICATIONS

English abstract for FR-2908473, May 16, 2008.

(Continued)

*Primary Examiner* — Hung Q Nguyen
(74) *Attorney, Agent, or Firm* — Rader, Fishman & Grauer PLLC

(57) ABSTRACT

An internal combustion engine may include a piston engine having at least one combustion chamber and a fresh air system for feeding fresh air to the at least one combustion chamber including at least one fresh air line. A bloom mixer may be arranged in the fresh air line and configured to divide a fresh air flow conducted in the fresh air line into at least two partial flows and reunite these again on the outflow side subject to the formation of a turbulence.

18 Claims, 8 Drawing Sheets

(56) References Cited

U.S. PATENT DOCUMENTS

| | | |
|---|---|---|
| 2002/0112708 A1* | 8/2002 | Fischer et al. ............ 123/568.17 |
| 2003/0111065 A1* | 6/2003 | Blum ........................ 123/568.17 |
| 2005/0072409 A1 | 4/2005 | Huebler |
| 2009/0050120 A1 | 2/2009 | Bischofberger et al. |

FOREIGN PATENT DOCUMENTS

| | | |
|---|---|---|
| DE | 102005020484 A1 | 11/2006 |
| EP | 1894616 A1 | 3/2008 |
| FR | 2847947 A1 | 6/2004 |
| FR | 2908473 A1 | 5/2008 |
| WO | WO-02/055866 | 7/2002 |
| WO | WO-2008095685 A2 | 8/2008 |

OTHER PUBLICATIONS

English abstract for FR-2847947, Jun. 4, 2004.
English abstract for DE-102004025254, Dec. 8, 2005.

\* cited by examiner

INTERNAL COMBUSTION ENGINE AND FRESH AIR SYSTEM

CROSS-REFERENCE TO RELATED APPLICATIONS

This application claims priority to German Patent Applications 10 2009 653.8 filed on Jul. 24, 2009 and PCT/EP2010/060419 filed on Jul. 19, 2010, which are hereby incorporated by reference in their entireties.

TECHNICAL FIELD

The present invention relates to an internal combustion engine, particularly of a motor vehicle, with the features of the preamble of claim 1. The invention additionally relates to a fresh air system for such an internal combustion engine.

BACKGROUND

Usually, an internal combustion engine, particularly if it is employed in a motor vehicle, comprises a piston engine, which comprises at least one combustion chamber and a fresh air system for feeding fresh air to the at least one combustion chamber. This fresh air system comprises at least one fresh air line in which a fresh air flow is conducted in the direction to the respective combustion chamber.

In the case of charged internal combustion engines, wherein in the fresh air system a charging device is arranged, a pre-ignition can occur at low rotational speeds and high loads, which constitutes a damaging hazard for the piston engine. Such a pre-ignition can, in particular, occur with petrol engines with direct injection. In the case of such a pre-ignition, the fuel-air mixture self-ignites during the compression, that is before the regular combustion can be initiated by means of an ignition spark. In this, the pre-ignition differs from the so-called knocking, with which a self-ignition of the as yet uncombusted mixture takes place only after the regular ignition. Possible courses for the pre-ignition are among other things so-called hot spots, i.e. localised regions in the respective combustion chamber which because of an inhomogeneous temperature distribution have a higher temperature relative to their surroundings, which can trigger the ignition.

Furthermore, for reducing pollutant emissions, it is generally known to recirculate exhaust gas from an exhaust system of the internal combustion engine into the fresh air system. Important in this context is an intensive mixing-through between fresh air and recirculated exhaust gas before the fresh air-exhaust gas mixture enters the respective combustion chamber.

SUMMARY

The present invention deals with the problem of stating an improved embodiment for an internal combustion engine of the type mentioned at the outset or for an associated fresh air system which is characterized in particular in that the hazard of a pre-ignition is reduced or in that an improved mixing-through between the fed-in fresh air and recirculated exhaust gas is obtained.

According to the invention, this problem is solved through the subject of the independent claims. Advantageous embodiments are the subject of the dependent claims.

The invention is based on the general idea of arranging a bloom mixer in the fresh air line, that is upstream of at least one combustion chamber. During the operation of the internal combustion engine, such a bloom mixture can divide a fresh air flow conducted in the fresh air line into at least two partial flows and reunite said partial flows subject to the formation of a turbulence. Because of this, an intensive mixing-through of the two partial flows can be realised. This can lead to a homogenisation of the temperature distribution in the respective combustion chamber, which diminishes the formation of hotspots. Insofar the hazard of a pre-ignition can be reduced. In the case of an exhaust gas recirculation, wherein in particular through the type of the feeding of the recirculated exhaust gas one of the partial flows contains a greater exhaust gas component or consists exclusively of the recirculated exhaust gas, the bloom mixer ensures an intensive mixing-through of fresh air and exhaust gas, as a result of which a largely homogenised fresh air-waste gas mixture can be created.

Bloom mixers are known with aircraft engines operating with two gas flows. To this end, a central core flow with a peripheral flow running coaxially thereto is mixed at an outlet of the engine with the help of an annularly extending bloom mixture arranged coaxially between core flow and peripheral flow. Here, with such a two-flow aircraft engine, the core flow and the peripheral flow are conducted separately from the start, so that merely the combining of the two flows at the engine outlet takes place via the ring bloom mixer.

According to a particularly advantageous embodiment, the bloom mixer used in the fresh air system here can comprise a sheet-metal body having an outflow side with a bloom structure and an onflow side and which divides the fresh air line from an onflow edge of the sheet-metal body as far as to an outflow edge of the sheet-metal body into two line sections that can be subjected to parallel through-flow. Through this design, the bloom mixer has a comparatively small flow resistance, which is advantageous for the efficiency of the fresh air system or of the internal combustion engine.

According to a further development, the bloom structure can comprise a plurality of waves which are arranged next to one another transversely to the through-flow direction of the fresh air line. In comparison to an exhaust gas flow of a ring bloom mixer arranged in an aircraft engine, the bloom mixer introduced here for a use in the fresh air system has a flat or developed structure, wherein the waves of the bloom structure are arranged in a straight line next to one another and not along ring. This design results in an extremely cost-effective construction which in addition can be assembled comparatively easily and realises an adequate mixing-through. Alternatively, an embodiment wherein the bloom mixture is configured in the shape of a ring is also conceivable. The waves of the wave structure are then arranged adjacent to one another in circumferential direction. The incoming flow is then divided coaxially, that is divided into two concentric partial flows.

According to another advantageous embodiment, the sheet-metal body of the bloom mixer can be adjusted regarding its relative position to the fresh air line by means of an adjusting device. Because of this it is possible during the operation of the internal combustion engine to change the effect of the bloom mixer, for example in order to adjust the bloom mixer to different operating points of the internal combustion engine.

According to another advantageous embodiment, an infeed point, via which a recirculation line of an exhaust gas recirculation system of the combustion engine is connected to the fresh air line can be so positioned relative to the bloom mixer for recirculating exhaust gas into the fresh air line that the recirculated exhaust gas only flows into one of the line sections which are separated from one another through the sheet-metal body of the bloom mixer in the fresh air line.

Thus, recirculated exhaust gas or an exhaust gas-fresh air mixture is present only on one side of the sheet-metal body, that is in the one line section, while on the other side of the sheet-metal body, that is in the other line section, only fresh air flows. The bloom mixer then ensures an intensive mixing-through of the two partial flows and creates a homogenised fresh air-exhaust gas mixture downstream.

According to an advantageous further development, a flow guiding element can be arranged in the fresh air line upstream of the infeed point which is adjustable in order to obstruct the inflow of fresh air to one of the line sections to a greater or lesser degree depending on the position of the flow guiding element. For example, the flow guiding element can be pivotable about an axis, which extends transversely to the through-flow direction and parallel to a separating plane, in which the sheet-metal body separates the two line sections from each other. In this case, the flow guiding element obstructs the inflow of fresh air into one of the line sections to a greater or lesser degree dependent on its pivot position. With the help of such an adjustable and particularly pivotable flow guiding element, the pressure in the line section assigned to the infeed point can be influenced. This produces the possibility of controlling the quantity of the recirculated exhaust gas, that is adjusting the exhaust gas recirculation rate.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar of functionally same components.

BRIEF DESCRIPTION OF THE DRAWINGS

It shows, in each case schematically.

DETAILED DESCRIPTION

Figure 1:
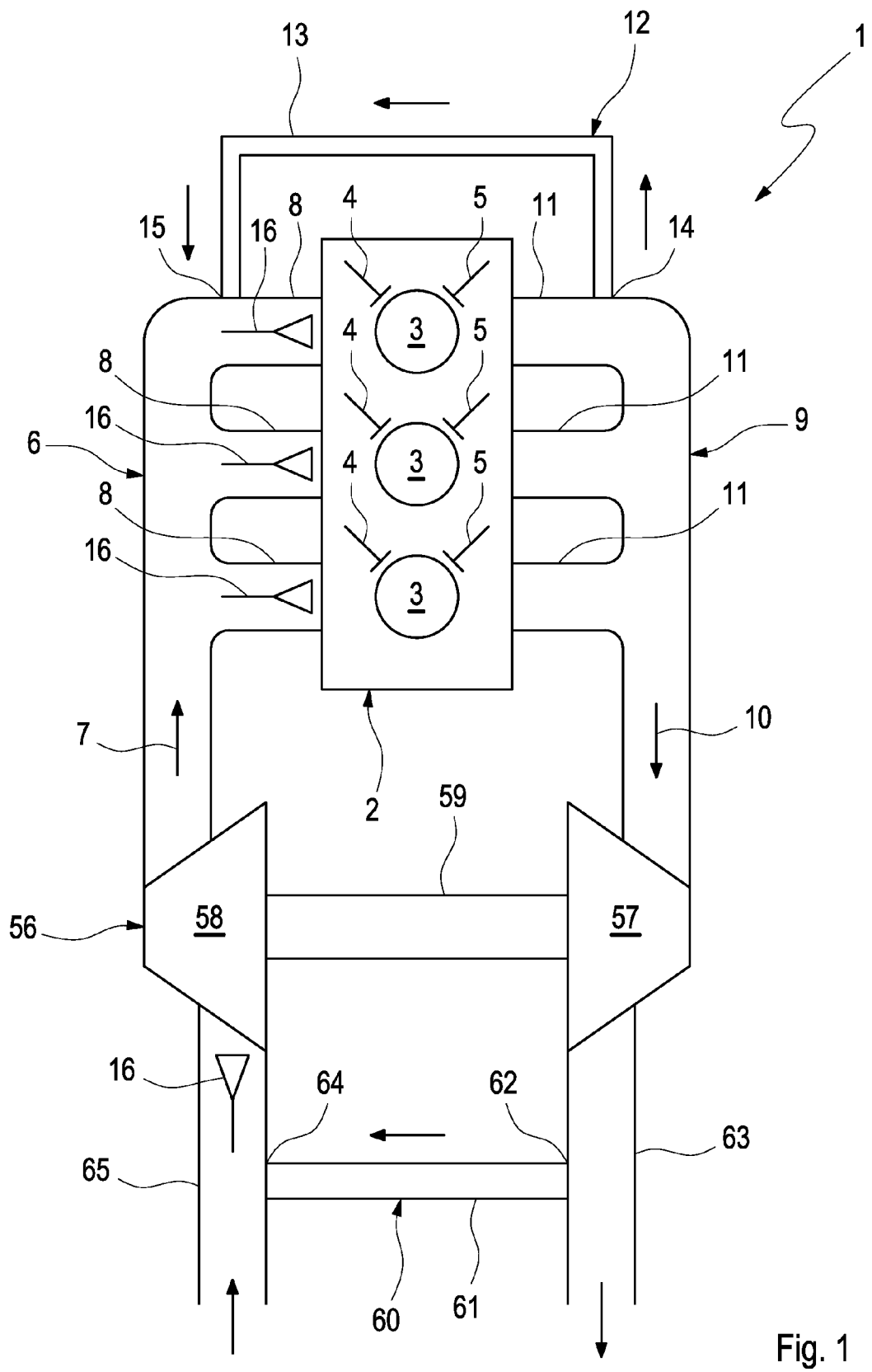
FIG. 1 a highly simplified schematic representation of an internal combustion engine in the manner of a circuit diagram, FIG. 2 a highly simplified detailed view of the internal combustion engine in the region of a combustion chamber, FIG. 3 a perspective view of a portion of a fresh air line with bloom mixer arranged therein, FIG. 4 a perspective view of the bloom mixer, FIG. 5 a perspective view of the bloom mixer with another embodiment, FIG. 6 a perspective view of the bloom mixer with a further embodiment, FIG. 7 a cross-sectional profile of the bloom mixer from FIG. 4, FIG. 8 a highly simplified lateral view of the portion of the fresh air line with bloom mixer arranged therein, FIG. 9 a view as in FIG. 3, however with another embodiment, FIG. 10 a lateral view as in FIG. 8, however with the embodiment shown in FIG. 9, FIGS. 11 and 12 views as in FIG. 10, however of further embodiments.

According to FIG. 1, an internal combustion engine 1, which in particular can be arranged in a motor vehicle, comprises a piston engine 2, which can be a petrol engine or a diesel engine, wherein in each case a direct injection of fuel can be provided. The piston engine 2 comprises at least one combustion chamber 3. In the example, without restriction of the generality, three combustion chambers 3 are shown for controlling gas exchange operations, the piston engine 2 is equipped with gas exchange valves, namely with inlet valves 4 and exhaust valves 5 in the usual manner.

The internal combustion engine 1 additionally comprises a fresh air system 6, via which the fresh air reaches the combustion chambers 3 in accordance with an arrow 7. To this end, the fresh air system for each combustion chamber 3 comprises at least one fresh air line 8. In the example, three fresh air lines 8 are therefore provided.

The internal combustion engine 1 furthermore comprises an exhaust system 9, which in accordance with an arrow 10, discharges exhaust gas away from the combustion chambers 3. In the example, the exhaust system 9 to this end comprises three exhaust lines 11.

In the case of a charged piston engine 2, a charging device 56 can be additionally provided in order to increase the pressure level on the fresh air side. In the example of FIG. 1, the charge device is configured as exhaust gas turbocharger 56, the turbine 57 of which is incorporated in the exhaust system 9 and the compressor 58 of which is incorporated in the fresh air system 6. Here, a turbine wheel of the turbine 57 and a compressor wheel of the compressor 58 can be interconnected in the usual manner by way of a common wave 59.

In addition, the internal combustion engine 1 can be equipped with an exhaust gas recirculation system 12 or 60, with the help of which exhaust gas from the exhaust system 9 can be recirculated to the fresh air system 6. In the case of a charged piston engine 2, the exhaust gas recirculation can be realised on the high-pressure side, i.e. with a removal taking place upstream of the turbine 57 and an infeed taking place downstream of the compressor 58, or on the low-pressure side, i.e. with a removal taking place upstream of the turbine 57 and an infeed taking place upstream of the compressor. In the example of FIG. 1, both a high-pressure EGR system 12 as well as a low-pressure EGR system 60 are shown for illustration. The HD-EGR system 12 comprises at least one recirculation line 13. Said recirculation line is connected to the exhaust system 9 or to an exhaust line 11 via a removal point 14 arranged upstream of the turbine 57 and to the fresh air system 6 or to one of the fresh air lines 8 via an infeed point 15 arranged downstream of the compressor 58. Practically, each fresh air line 8 can be assigned its own recirculation line 13, however at least one own infeed point 15. Because of this, an individual exhaust gas recirculation is possible for each cylinder or for each combustion chamber 3. In contrast with this, the LD-EGR system 60 comprises at least one recirculation line 61. Said recirculation line is connected to the exhaust system 9 or to an exhaust line 63 via a removal point 62 arranged downstream of the turbine 57 and to the fresh air system 6 or to a fresh air line 65 via an infeed point 64 arranged upstream of the compressor 58. Practically, only a single recirculation line 61 is then provided. Because of this, a common or collective exhaust gas recirculation is realised for all cylinders or for all combustion chambers 3. In addition, an EGR system which is not shown here can also be realised, wherein the exhaust gas to be recirculated is removed on the high-pressure side, i.e. upstream of the turbine 57 and fed in on the low-pressure side, i.e. upstream of the compressor 58.

In the respective fresh-air line 8, a bloom mixer 16 is arranged. In the example, a bloom mixer 16 each is arranged in each fresh-air line 8. The respective bloom mixer 16 in this case is located upstream of the inlet valves 4. In the shown example, it belongs to the scope of construction of the fresh air system 6. However, with another embodiment, it can be arranged in a portion of the respective fresh air line 8 arranged in the piston engine 2 and insofar be part of the scope of construction of the piston engine 2. Insofar as an LD-EGR system 60 is provided, such a bloom mixer 16 can also be provided upstream—or alternatively downstream—of the compressor 58.

Figure 2:
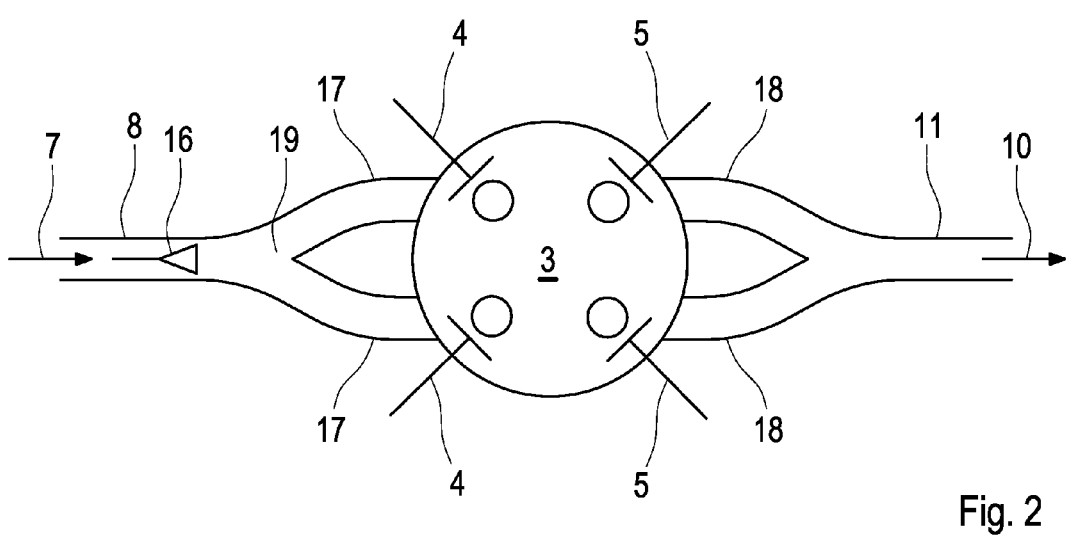
Figure 3:
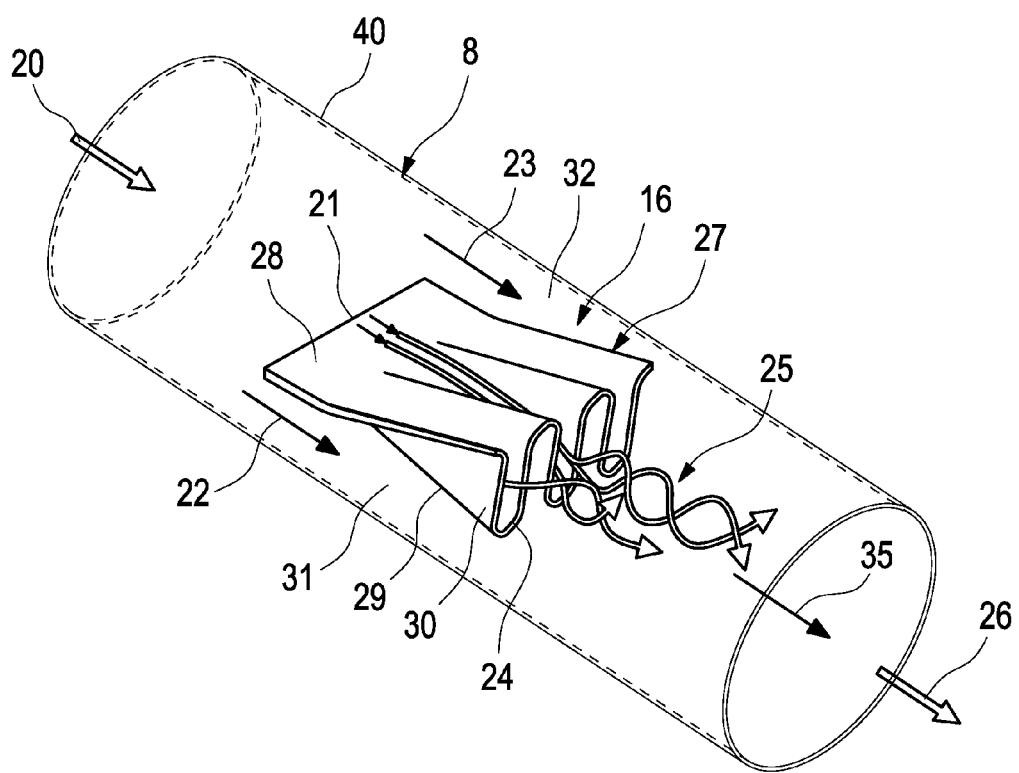

According to FIG. 2, the respective fresh air line 8, particularly within the piston engine 2, can branch out into at least two end portions 17. Each end portion 17 is connected to one of the combustion chambers 3 via an inlet valve 4 each. These end portions 17 can be arranged within the piston engine 2. In the example of FIG. 2, the exhaust line 11 is suitably constructed and equipped with two starting portions 18, which via an exhaust valve 5 each are connected to the combustion chamber 3, wherein the respective starting portion 18 can be arranged in particular within the piston engine 2. The bloom mixer 16 with such a configuration of the fresh air line 8 is arranged upstream of the branch-out point designated 19, where the fresh air line 8 branches out into two end portions 17.

In FIGS. 1 and 2 a simplified lateral view of the bloom mixer 16 is reflected symbolically for the simplified representation of the bloom mixer 16, as it can also be found in FIGS. 8 and 10 to 12. This lateral view, however, in FIGS. 1 and 2, is rotated by 90° compared with the actual installation position relative to the combustion chambers 3, namely by an axis of rotation running in the drawing plane and parallel to the flow direction.

Corresponding to FIGS. 3 to 12, the bloom mixer 16 is configured such and arranged in the respective fresh air line 8 so that in operation of the combustion engine 1 it divides a fresh air flow 20 conducted in the fresh air line 8 on the onflow side, i.e. on an onflow edge 21 into at least two partial flows 22, 23 and on the outflow side, that is on an outflow edge 24, reunites these into a fresh air flow 26 subject to the formation of a turbulence 25, which is homogenised downstream of the bloom mixer 16 because of the turbulence 25. To this end, the bloom mixer 16 according to the preferred embodiments shown here is equipped with a sheet-metal body 27. Said sheet-metal body has an onflow side 28, which comprises the onflow edge 21, and an outflow side 29, which comprises the outflow edge 24 and a bloom structure 30. The sheet-metal body 27 divides the fresh air line 8 from the onflow edge 21 to the outflow edge 24 into two line portions 31, 32, which can be subjected to a parallel through-flow, namely by the partial flows 22, 23. The sheet-metal body 27 in this case defines a separating plane 33 indicated in FIG. 7, in which the sheet-metal body 27 separates the two line portions 31, 32 from each other.

Figure 4:
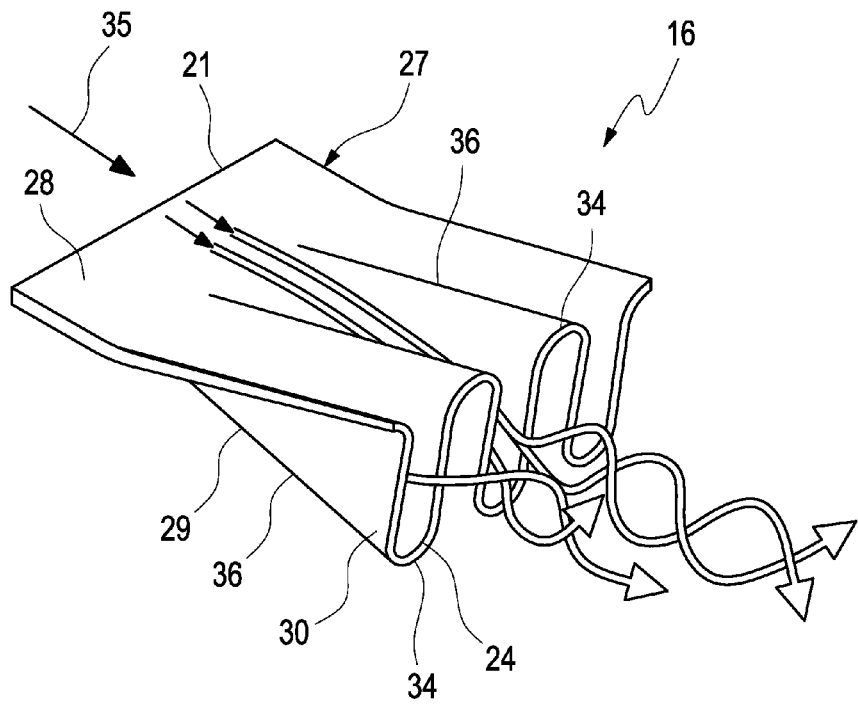
Figure 5:
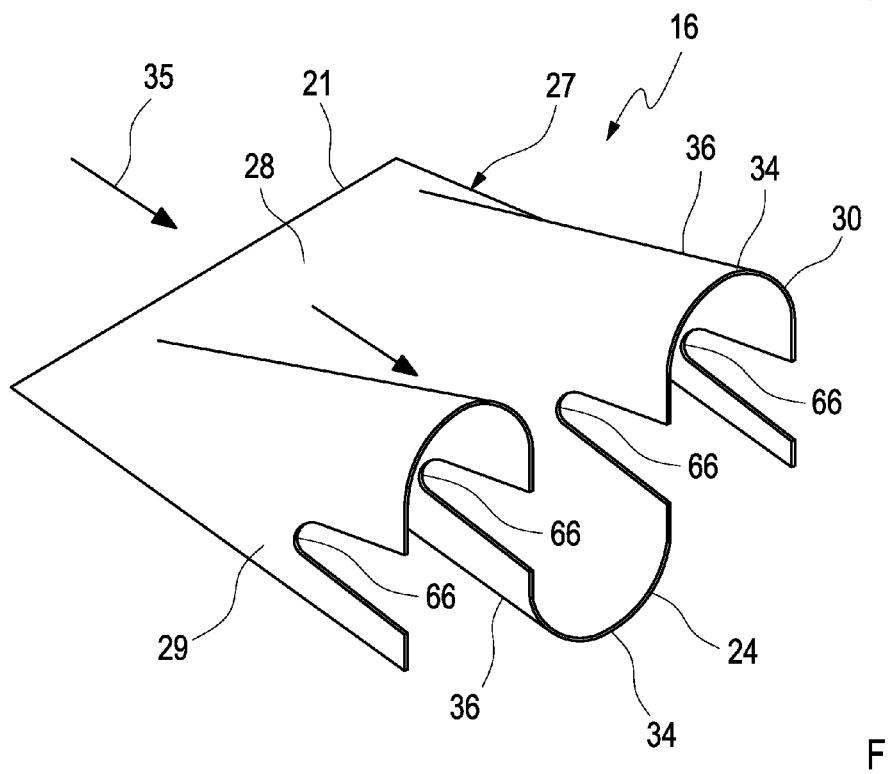
Figure 6:
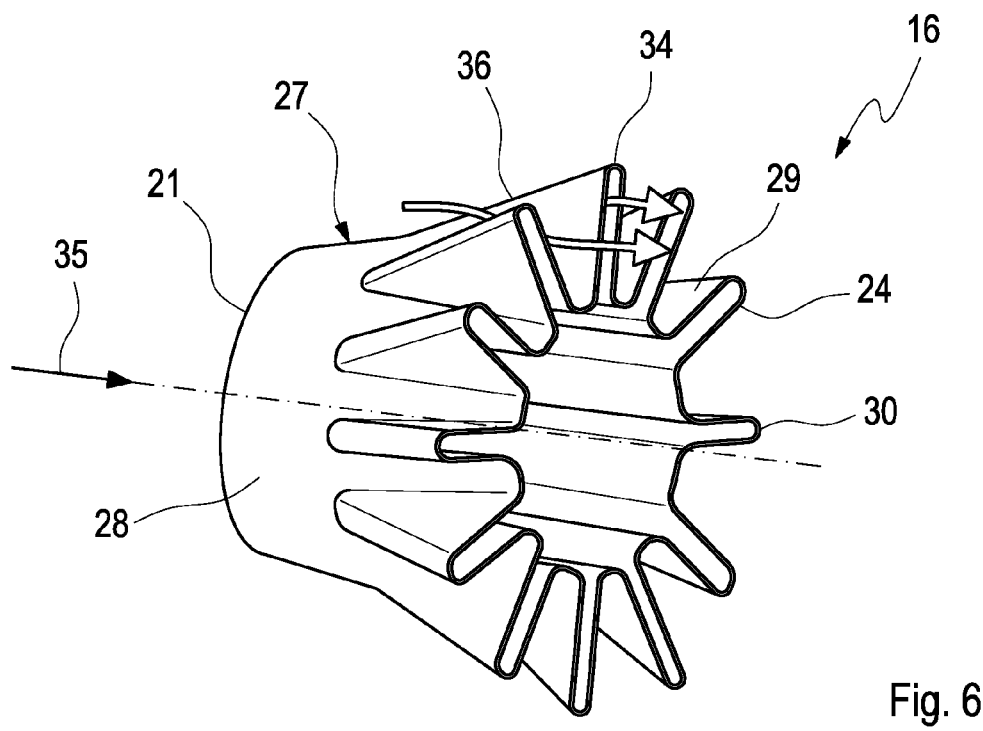
Figure 7:
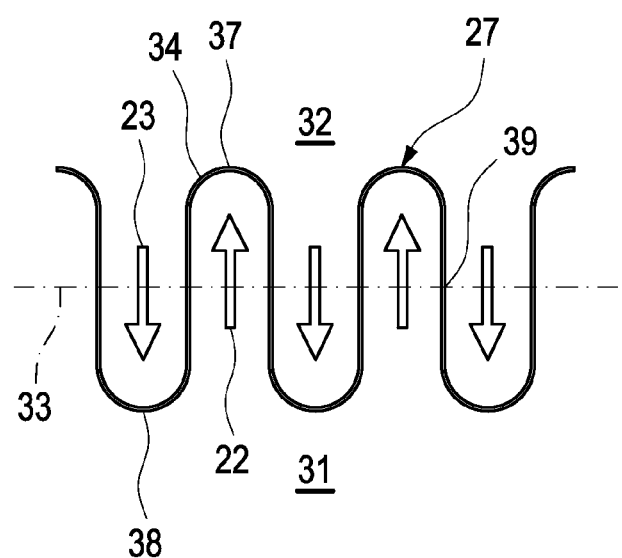

As can be taken from FIGS. 4 to 7 in particular, the bloom structure 30 comprises a plurality of waves 34, which waves form the "blooms" of the bloom structure 30 or of the bloom mixer 16. The waves 34 with the embodiments of FIGS. 4, 5 and 7 are arranged next to one another transversely to a through-flow direction 35 of the fresh air line 8. Insofar, the bloom mixer 16 is a flat or developed bloom mixer 16.

In contrast with this, FIG. 6 shows a ring-shaped bloom mixer 16, wherein the waves 34 relative to the through-flow direction 35, are arranged in the circumferential direction next to one another. With this embodiment, a coaxial division of the oncoming exhaust gas flow 20 occurs during the through-flow of the bloom mixer 16. As a consequence, the partial flows 22 and 23 then flow concentrically to one another and are rejoined again at the outlet of the bloom mixer 16 and intensively mixed through the turbulence 25.

In the case of the bloom structures 30 shown here, the waves 34 grow with respect to their amplitudes in the through-flow direction 35. In the example, they grow evenly, namely linearly. In addition, they are orientated parallel to one another. Insofar, straight-line apex lines 36 materialise for the waves 34 which run towards the onflow side 28 of the sheet-metal body 27 or originate from the latter.

Here, the waves 34 have round, particularly semi-circular wave crests 37 and wave troughs 38. Furthermore, straight-line transition portions 39 are provided in the example between adjacent wave crests 37 and wave troughs 38. Here, the individual transition portions 39 can extend parallel to one another.

The individual waves 34 practically start at an end of the on-flow side 28 spaced from the on-flow edge 21 and because of this define the transition to the outflow side 29. Advantageously, the waves 34 with respect to the separating plane 33, are configured mirror-symmetrically. With the embodiments shown here, the waves 34 are configured identically. However, it is possible to equip the waves 34 with different amplitude. In particular, the waves 34 arranged proximally with respect to a wall 40 of the fresh air line 8 can have smaller amplitudes than the waves 34 arranged distally with respect to the wall 40.

In the examples of FIGS. 4 and 5, the on-flow edge 21 is configured in a straight line. Furthermore, it extends transversely to the through-flow direction 35. Practically, the on-flow side 28 is configured flat, i.e. formed by a flat portion of the sheet-metal body 27. In the example of FIG. 6, the on-flow edge 21 and the out-flow edge 24 are each located in a plane which extend transversely to the through-flow direction 35. In addition, the on-flow edge 21 in this case is configured ring-shaped.

The sheet-metal body 27, which forms the bloom mixer 16, can be designed as a unitary shaped sheet-metal part. This shaped sheet-metal part can be produced from a single sheet-metal part through forming, in order to form the sheet-metal body 27. Alternatively, it is likewise possible to produce the bloom mixer 16 through laser sintering or as casting.

Although the shape of the bloom mixer 16 described here is preferred, it does not exclude other shapes. In particular, the waves 34 can also have other shapes.

The out-flow edge 24 in this case is configured wavy and lies in a plane which extends transversely to the through-flow direction 35. It is clear that for the configuration of the out-flow edge 24 also other configurations can be suitable, for example in order to improve the mixing-through or turbulence 25 and/or in order to reduce the flow resistance of the bloom mixer 16. Accordingly, FIG. 5 purely exemplarily shows an embodiment, wherein the waves 34 on the out-flow edge 24 comprise incisions 66. These incisions 66 extend from the out-flow edge 24 against the through-flow direction 35 and can for example be wedge-shaped. The provision of such incisions 66 is also called scalloping.

According to FIGS. 8 and 10 to 12, the sheet-metal body 27 or the bloom mixer 16 can be adjusted with the help of an adjusting device 41 with respect to a relative position between fresh air line 8 and bloom mixer 16 or between fresh air line 8 and sheet-metal body 27. To this end, the adjusting device 41 is suitably coupled to the bloom mixer 16 or to the sheet-metal body 27. The adjusting device 41 can for example operate electromotorically or pneumatically or hydraulically or through a combination thereof. According to an advantageous embodiment, the adjusting device 41 can be configured so that it makes possible a transverse adjustment 42 of the sheet-metal body 27 in the fresh air line 8 indicated by a double arrow, which extends transversely to the separating plane 33. Additionally or alternatively, the adjusting device 41 can be configured so that it makes possible a pivot adjustment 43 of the sheet-metal body 27 about a pivot axis 44 indicated by a direction of rotation double arrow, which lies in the separating plane 33 and which extends transversely to the through-flow direction 35. Additionally or alternatively, the adjusting device 41 can be configured so that it makes possible rotational adjustment 45 of the sheet-metal body 27 about a rotary axis 46 indicated by a rotation double arrow, which extends parallel to the through-flow direction 35 and which in the example lies in the separating plane. In addition or alternatively, the adjusting device 41 can be configured so that it makes possible a longitudinal adjustment 47 of the sheet-metal body 27 parallel to the through-flow direction 35 indicated by a double arrow.

Figure 9:
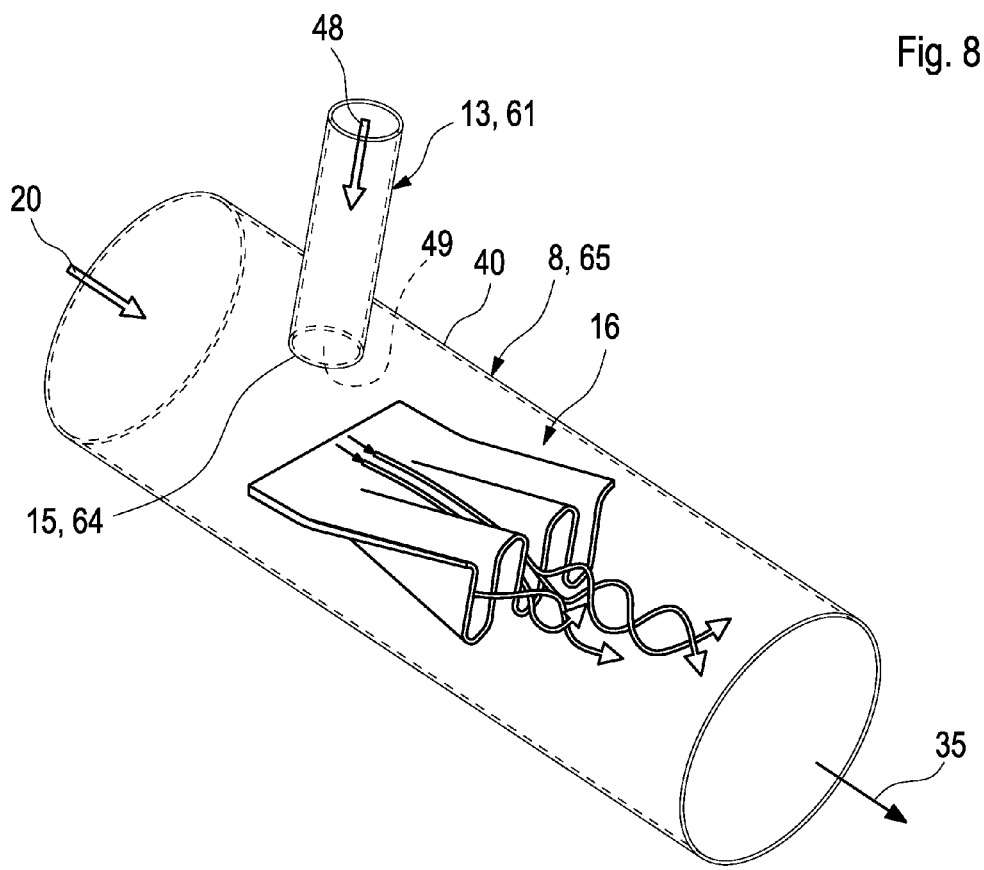
Figure 10:
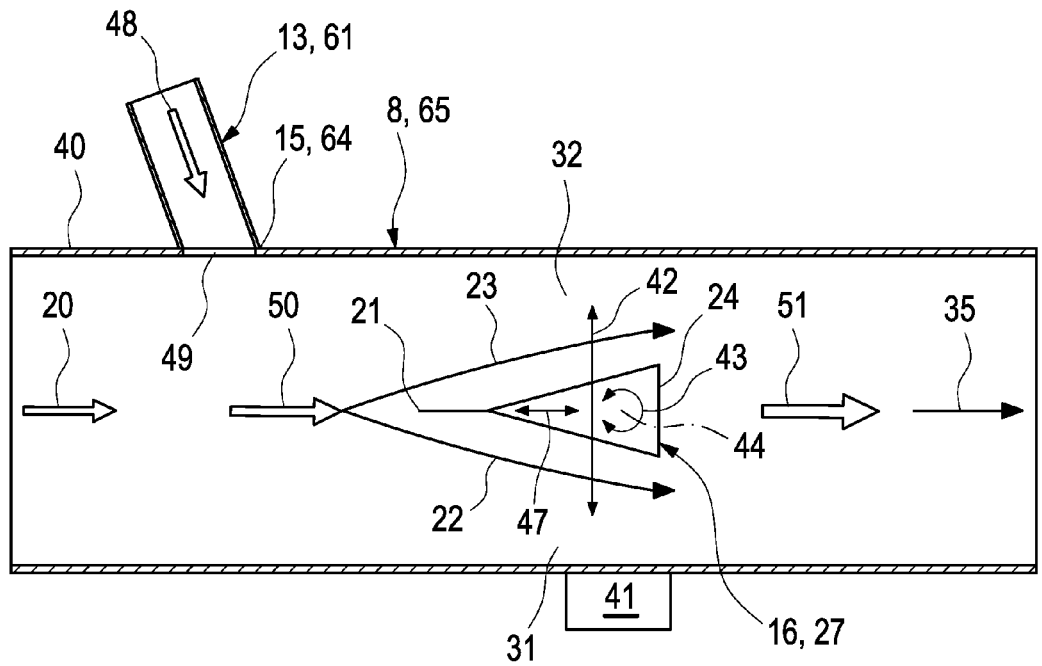

In the case of FIGS. 9 to 12, the respective infeed point 15, 64, via which the recirculation line 13, 61 is connected to the fresh air line 8, 65 and via which the recirculated exhaust gas can be fed into the fresh air flow 20 of the fresh air line 8, 65 according to an arrow 48 is arranged in the region of the bloom mixer 16. FIGS. 9 and 10 in this case show an embodiment, wherein the infeed point 15, 64 is located upstream of the bloom mixer 16. In contrast with this, FIGS. 11 and 12 each show an embodiment, wherein the infeed point 15, 64 is arranged between the on-flow edge 21 and the out-flow edge 24 of the bloom mixer 16. In both cases, the infeed point 15, 64 is formed by a radial opening 49, which is introduced in the wall 40 of the fresh air line 8, 65. However, another embodiment which is not shown here is also conceivable, wherein the respective infeed point 15, 64 is formed through an axial opening which is opened in the through-flow direction 35. This axial opening is then located at an open end of an infeed pipe, which protrudes through the wall 40 into the fresh air line 8, 65.

Figure 11:
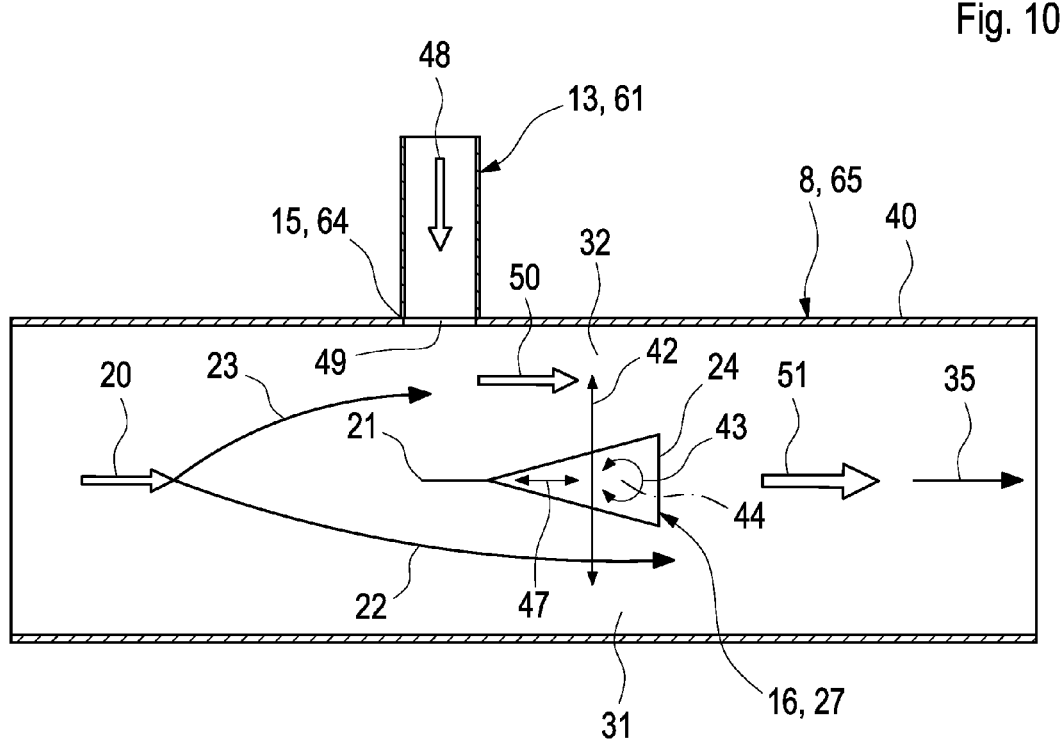
Figure 12:
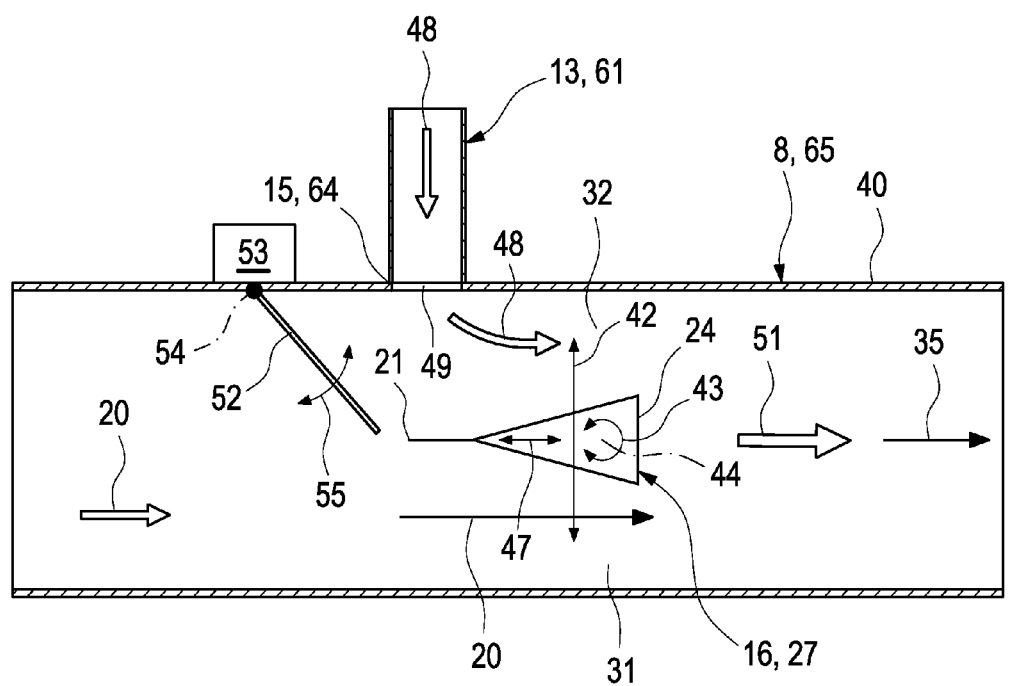

In the examples of FIGS. 9, 11 and 12, the infeeding of the recirculated exhaust gas 48 substantially takes place perpendicularly to the fresh gas flow 20. In principle, however, other angles can also be realised between the fed-in exhaust gas 48 and the fresh air 20. Representative of all versions, FIG. 10 for example shows a configuration wherein between the fed-in exhaust gas 48 and the fresh air 20 an obtuse angle orientated in the through-flow direction 35 is present. An obtuse angle orientated against the through-flow direction 35 is likewise possible as well. Furthermore, any desired geometries for example round, angular, circular, oval, elliptical, slit-shaped etc. are also conceivable for the wall opening 49 in principle, while elongated openings 49 if applicable can have an orientation that is parallel or transverse to the through-flow direction 35.

Thus, the infeeding of recirculated exhaust gas 48 to the fresh air flow 20 takes place in FIG. 10, as a result of which a poorly intermixed mixture flow 50 is formed. The bloom mixer 16 then creates a mixture flow 51 which is well mixed through, particularly homogenised.

In the case of the embodiments of FIGS. 11 and 12, the infeed point 15 is positioned relative to the bloom mixer 16 so that the recirculated exhaust 48 substantially flows only into the one line portion 32. The recirculated exhaust gas 48 in this case flows into the line portion 32 facing the infeed point 15. In this manner, the partial flow 23 conducted through this line portion 32 is substantially intermixed with the recirculated exhaust gas 48. The turbulence and intensive mixing-through of the fresh air-exhaust gas mixture is then carried out by the bloom mixer 16.

According to FIG. 11, the recirculated exhaust gas 48 is thus fed to the partial flow 23, as a result of which the poorly mixed-through mixture flow 50 is created again. Downstream of the bloom mixer 16, the thoroughly mixed-through or homogenised mixture flow 51 is again present.

FIG. 12 shows an embodiment, wherein in the fresh air line 8 upstream of the infeed point 15 a flow guiding element 52 is arranged. This is formed in the example by a flap. Furthermore, an adjusting drive 53 is provided, with the help of which the flow guiding element 52 is adjustable. In the drawn example, the flow guiding element 52 can be pivoted about an axis 54, which extends transversely to the through-flow direction 35 and parallel to the separating plane 33. Depending on the adjusted position of the flow guiding element 52, a more or less intensive obstruction results for the inflow of fresh air to the line portion 32 which faces the infeed point 15. The adjustability of the flow guiding element 52 is indicated in FIG. 12 by a double arrow 55. In FIG. 12, a position for the flow guiding element 52 is adjusted, in which a relatively severe obstruction of the inflow of fresh air to said line portion 32 is present. In an extreme case, the flow guiding element 52 can be pivoted into a blocking position according to an advantageous embodiment, in which the inflow of fresh air to said line portion 32 is more or less blocked. In this case, the fresh air flow 20 then substantially flows completely through the line portion 31 facing away from the infeed point 15, while in the line portion 32 facing the infeed point 15, exclusively the recirculated exhaust gas flow 48 substantially flows. Downstream of the bloom mixer 16, the homogenised or well mixed-through mixture flow 51 is then again present.

Figure 8:
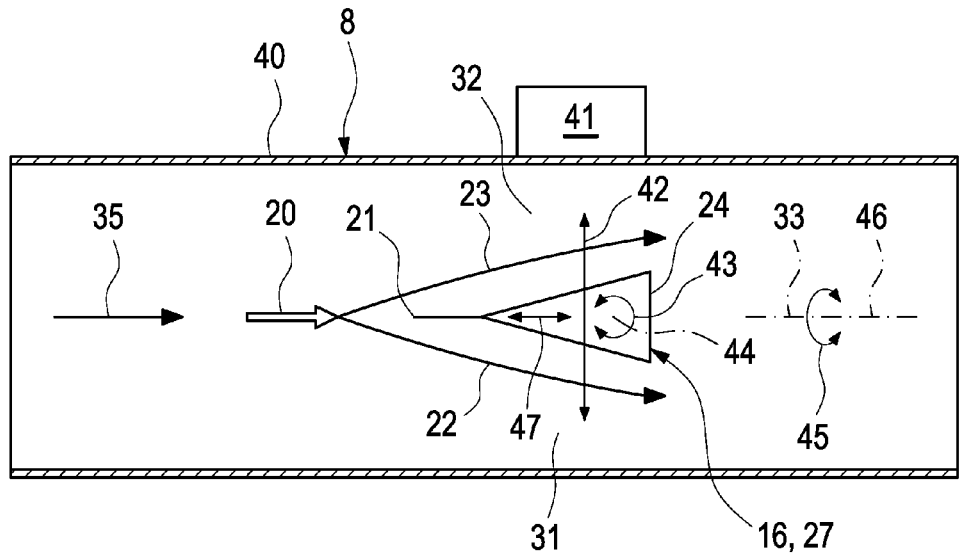

In the example of FIG. 12, the flow guiding element 52 is combined with the embodiment of FIG. 11; it is likewise possible to employ the flow guiding element 52 with the embodiment shown in FIG. 8 or in FIG. 10. In the examples of FIGS. 3 and 8 to 12, the bloom mixer 16 according to FIGS. 4 and 7 is employed in each case; the bloom mixers 16 of FIGS. 5 and 6 can likewise be employed.

The invention claimed is:
1. An internal combustion engine, comprising:
a piston engine having at least one combustion chamber,
a fresh air system for feeding fresh air to the at least one combustion chamber including at least one fresh air line,
a bloom mixer arranged in the fresh air line and configured to divide a fresh air flow conducted in the fresh air line into at least two partial flows and reunite these again on an out-flow side subject to the formation of a turbulence,
wherein the bloom mixer comprises a sheet-metal body having an on-flow side and an out-flow side with a bloom structure and which divides the fresh air line from an on-flow edge of the sheet-metal body to an out-flow edge of the sheet-metal body into two line portions configured to be subjected to parallel through-flow,
an infeed point connected to the fresh air line via a recirculation line of an exhaust gas recirculation system and arranged in at least one of a region upstream of the bloom mixer and in the bloom mixer for recirculating exhaust gas into the fresh air,
wherein the infeed point is positioned relative to the bloom mixer so that the recirculated exhaust gas only flows into one of the line portions, and
a flow guiding element arranged in the fresh air line upstream of the infeed point and which is adjustable in order to more or less obstruct the inflow of fresh air to one of the line portions dependent on its position.
2. The internal combustion engine according to claim 1, wherein the bloom structure includes a plurality of waves which are arranged next to one another transversely to a through-flow direction of the fresh air line.

3. The internal combustion engine according to claim 2,
wherein the waves, with respect to their amplitudes, grow in the through-flow direction,
the waves have straight-line apex lines,
the waves have semi-circular wave crests and wave troughs, between which straight-line transition portions extend and run parallel to one another,
the waves start at an end of the on-flow side spaced from the on-flow edge, and
the two line portions are separated and are configured to mirror symmetrically with respect to a separating plane.

4. The internal combustion engine according to claim 1,
wherein the on-flow edge is configured in a straight line extending transversely to a through-flow direction of the fresh air line, and
the on-flow side is configured flat.

5. The internal combustion engine according to claim 1,
wherein the bloom structure includes a plurality of waves arranged next to one another in the circumferential direction of the fresh air line.

6. The internal combustion engine according to claim 1,
wherein at least one of the bloom mixer and the sheet-metal body is configured to be adjustable with respect to the relative position to the fresh air line by an adjusting device.

7. The internal combustion engine according to claim 6,
wherein the adjusting device is configured to make a transverse adjustment of the sheet-metal body in the fresh air line transversely to a separating plane, the sheet-metal body separating the two line portions from each other.

8. The internal combustion engine according to claim 6,
wherein the adjusting device is configured to make a rotational adjustment of the sheet-metal body about a rotational axis running parallel to a through-flow direction.

9. The internal combustion engine according to claim 8,
wherein the adjusting device is configured to make a pivot adjustment of the sheet-metal body about a pivot axis running transversely to a through-flow direction and located in a separating plane, the sheet-metal body separating the two line portions from each other.

10. The internal combustion engine according to claim 9,
wherein the adjusting device is configured to make a longitudinal adjustment of the sheet-metal body parallel to the through-flow direction.

11. The internal combustion engine according to claim 10,
wherein the infeed point is formed by at least one of a radial opening provided in a wall of the fresh air line, and by an axial opening located at an end of an infeed pipe which protrudes through a wall of the fresh air line into the latter.

12. The internal combustion engine according to claim 11,
wherein the flow guiding element is pivoted into a blocking position to block the inflow of fresh air to the one of the line portions.

13. The internal combustion engine according to claim 12,
wherein the fresh air line includes a branch-off that branches out into at least two end portions, each connected to the combustion chamber via an inlet valve, and wherein the bloom mixer is arranged upstream of the branch-off.

14. The internal combustion engine according claim 6,
wherein the adjusting device is configured to make a pivot adjustment of the sheet-metal body about a pivot axis running transversely to a through-flow direction and located in a separating plane, the sheet-metal body separating the two line portions from each other.

15. The internal combustion engine according to claim 6,
wherein the adjusting device is configured to make a longitudinal adjustment of the sheet-metal body parallel to a through-flow direction.

16. The internal combustion engine according to claim 6,
wherein the infeed point is formed by at least one of a radial opening provided in a wall of the fresh air line, and
by an axial opening located at an end of an infeed pipe which protrudes through a wall of the fresh air line into the latter.

17. The internal combustion engine according to claim 1,
wherein the flow guiding element is pivoted into a blocking position to block the inflow of fresh air to the one of the line portions.

18. The internal combustion engine according to claim 1,
wherein the fresh air line includes a branch-off that branches out into at least two end portions, each connected to the combustion chamber via an inlet valve, and wherein the bloom mixer is arranged upstream of the branch-off.

* * * * *